United States Patent [19]
Hofmair et al.

[11] Patent Number: 5,270,743
[45] Date of Patent: Dec. 14, 1993

[54] EYEGLASS FRAME

[75] Inventors: Herbert Hofmair, Linz; Gerhard Fuchs, Pasching, both of Austria

[73] Assignee: Silhouette International Gesellschaft mbH, Linz, Austria

[21] Appl. No.: 821,353

[22] Filed: Jan. 15, 1992

[30] Foreign Application Priority Data

Jan. 17, 1991 [AT] Austria ................... 95/91

[51] Int. Cl.⁵ ............................... G02C 1/00
[52] U.S. Cl. ............................ 351/86; 351/92; 351/106
[58] Field of Search ............ 351/86, 92, 106, 109, 351/142, 154, 91; 2/442, 443

[56] References Cited

U.S. PATENT DOCUMENTS

| | | | |
|---|---|---|---|
| 2,329,100 | 9/1943 | Chappell | 351/92 |
| 2,512,011 | 6/1950 | Crane | 351/92 |
| 2,553,496 | 5/1951 | Castelli . | |
| 2,868,074 | 1/1959 | Angelis | 351/92 |
| 4,466,713 | 8/1984 | Tanaka . | |
| 5,098,180 | 3/1992 | Tobey | 351/92 |

FOREIGN PATENT DOCUMENTS 1772401  4/1971  Fed. Rep. of Germany .
970796   6/1950  France .

Primary Examiner—Bruce Y. Arnold
Assistant Examiner—Hung Xuan Dang
Attorney, Agent, or Firm—Collard & Roe

[57] ABSTRACT

To permit a variation of the design of the rim of an eyeglass frame, the two lens-holding rings of said rim are constituted by a common top rim member, which constitutes also a bridge, and two bottom rim members, which are separate from the top rim member and are provided each with a nose pad and are connected each to the top rim member by positive coupling means. Said coupling means comprise hooks, which are integrally formed with the bottom rim member and protrude outwardly from the opening for receiving the lens, and inwardly open recesses, which are formed in the top rim member and receive said hooks.

10 Claims, 2 Drawing Sheets

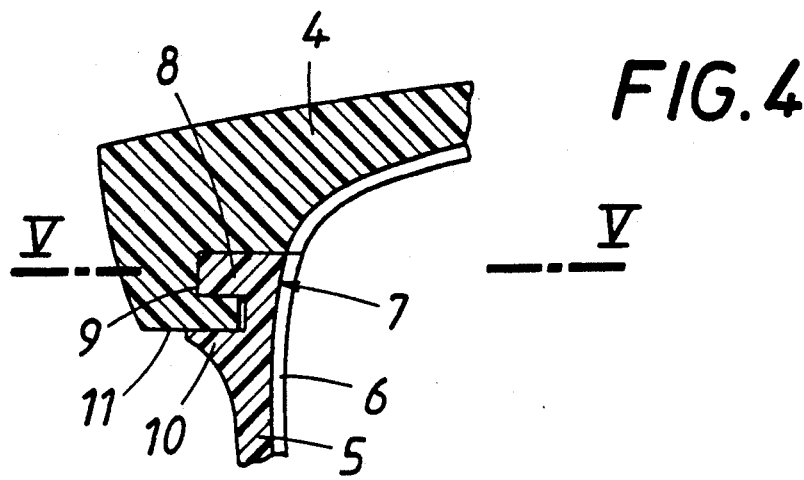
FIG. 4
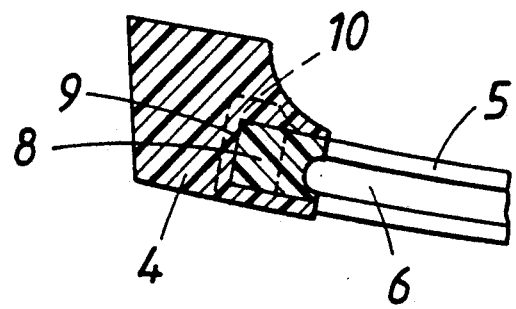
FIG. 5
FIG. 6
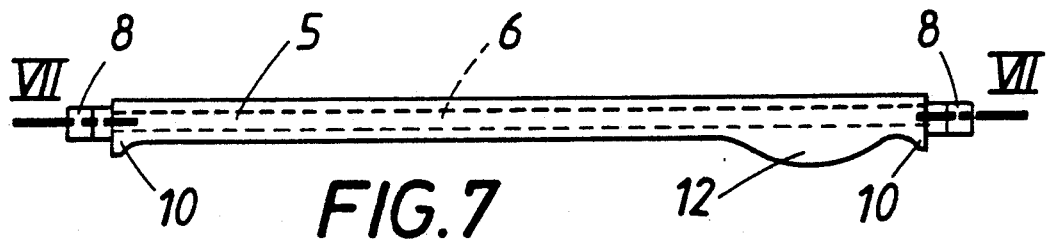
FIG. 7
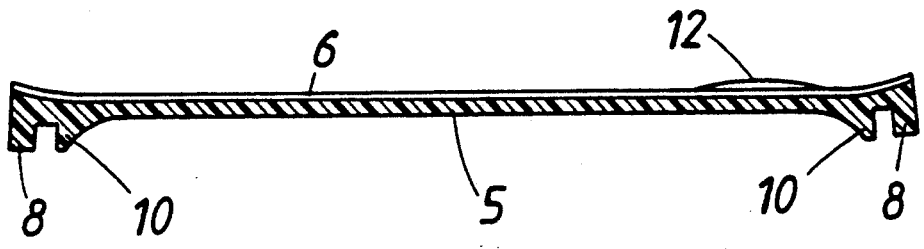

EYEGLASS FRAME

BACKGROUND OF THE INVENTION

1. Field of the Invention

This invention relates to an eyeglass frame having a rim comprising two lens-holding rings, which are connected by a bridge, wherein said two rings are constituted by a top rim member, which is common to both rings and includes also the bridge, and two bottom rim members, which are separate from the top rim member and belong to respective ones of said rings and are provided each with a nose pad, and each of said bottom rim members is detachably connected to the top rim member by positive coupling means.

2. Description of the Prior Art

In conventional eyeglasses comprising two lens-holding rings, the contour of the lenses and, as a result, also the shape of the eyeglasses, is determined by the eyeglass rim and cannot be changed. A specially shaped rim is required for eyeglasses of any given shape so that a high expenditure is involved in the manufacture and stockkeeping of differently shaped eyeglass rims.

In order to avoid said disadvantages it has already been suggested (in Published German Application 1,772,401 and French Patent Specification 970,746) to provide the bottom rim portions as members which are separate from a common top rim member, which includes also the bridge, and to detachably connect said members so that it will be possible to combine one and the same top rim member with bottom rim members having different shapes and/or different colors and the overall appearance of the eyeglasses can be varied. Said known eyeglass frames have the disadvantage that the bottom rim members are joined to the common top rim member by plug pins, which extend generally in the peripheral direction of the lens-holding rings and, as a rule, do not have the strength which would be required to hold the members of the rim together so that said members must additionally be connected by means of screws and tapped brackets integrally formed with said rim members or by means of locking pins extending transversely to the plane in which the rim extends. Said additional retaining elements add to the expenditure of material and render the assembling of the eyeglass rim more complicated.

Besides, U.S. Pat. No. 2,553,496 discloses eyeglasses comprising lens-holding rings which are constituted by a common top rim member and a common bottom rim member and said two rim members are joined by a snap-action coupling, which comprises hook means extending transversely to the plane of the eyeglass rim. But if that positive coupling is designed to be re-opened, there will be a risk of an unintended separation of the two rim members under the usually occurring loads so that the lenses will then be released.

SUMMARY OF THE INVENTION

For this reason it is an object of the invention to avoid the disadvantages outlined hereinbefore and to provide an eyeglass frame which is of the kind described first hereinbefore and is so improved by the use of simple means that simple and repeatedly separable coupling means are provided between the common top rim member and the bottom rim members and said coupling means will reliably be locked in their engaged position without a need for additional elements.

That object is accomplished in accordance with the invention in that the coupling means between each of the bottom rim members and the top rim member consist of two coupling hooks, which are formed on the bottom rim member and protrude outwardly from the lens-receiving opening, and two recesses, which are formed in the top member and open toward the lens-receiving opening and receive and interlock with respective ones of said hooks.

The parts of such a coupling interengage on the inside of the lens-holding ring so that the positive joint thus formed will be locked by the lens when it is subsequently inserted into the lens-holding ring because the lens will then prevent an extraction of the hooks from the recesses as such an extraction could be effected only in a radial direction relative to the lens. The eyeglasses frame thus obtained can well be compared in shape and strength to conventional eyeglass frames having integral lens-holding rings. When it is desired to replace the bottom rim members, it will be necessary first to force the lenses out of the rings and the bottom rim members can then be replaced without the need for an implement simply in that the hooks are extracted from the recesses and the new bottom rim members can subsequently be inserted.

In a particularly desirable design, the top rim member is flexurally stiff and the bottom rim members are flexible because in that case the eyeglass rim can be used with lenses having different contours, provided that such contour properly conforms to the top rim member whereas the flexible bottom rim members will tend to hug the contour of the lenses when they have been inserted. If will be necessary, however, for the bottom rim members to have a length which corresponds to the length of the associated portion of the periphery of the lenses so that the lenses will reliably be retained. The flexible bottom rim members will not only permit the use of lenses which have differently shaped contours adjacent to said bottom rim members but the use of a flexible material for such bottom rim members will permit them to be provided with nose pads by which the pressure applied to the nose will be more uniformly distributed throughout the contact surface.

Because the flexible bottom rim members will adapt themselves to the contour of the associated lenses, said bottom rim members do not need to have an initial curvature which matches a specific contour of the lenses. On the contrary, the flexible bottom rim members may be prefabricated as members which are initially straight at least in part so that the bottom rim members can be made by less expensive molds and it will be possible to make prefabricated parts which have different lengths for adaptation of the different peripheral lengths of the adjacent portions of the lenses. This is due to the fact that the prefabricated parts for forming the bottom rim members are straight and can be made by molds in which the length of the mold cavity can be increased or decreased by the use of inserts without a high expenditure.

BRIEF DESCRIPTION OF THE DRAWINGS

FIG. 4 is an enlarged sectional view showing a portion of an outer coupling between the top rim member and a bottom rim member.

FIG. 5 is a sectional view taken on line V—V in FIG. 4.

FIG. 6 is a side elevation showing a straight prefabricated part for use as a bottom rim member.

FIG. 7 is a sectional view taken on line VII—VII in FIG. 6.

DETAILED DESCRIPTION OF THE PREFERRED EMBODIMENT

Figure 1:
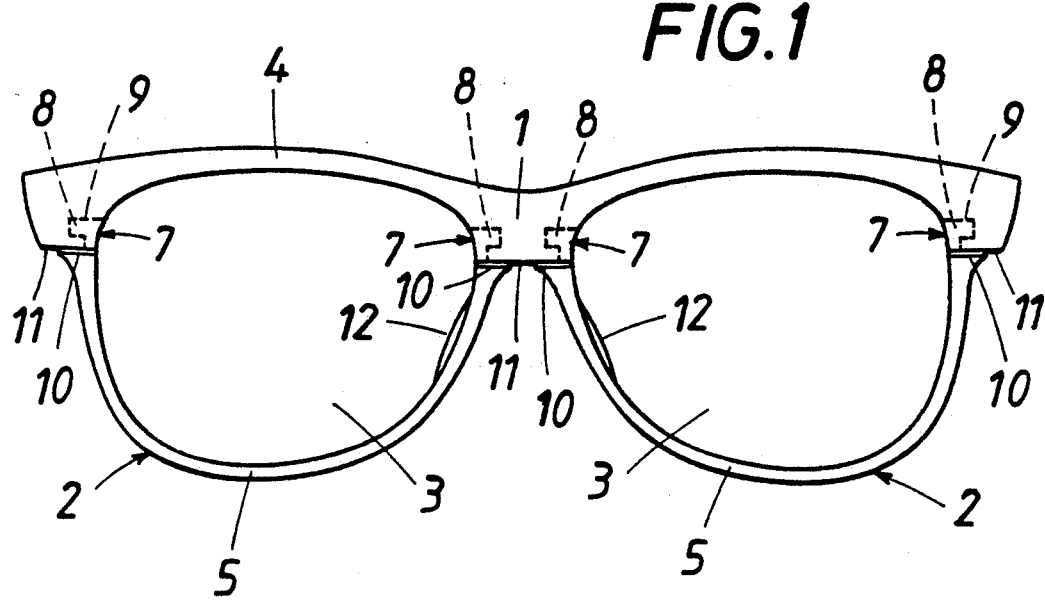
FIG. 1 is a simplified front elevation showing a rim of an eyeglass frame embodying the invention.

The rim of an eyeglass frame embodying the invention is shown by way of example on the drawing.

Figure 2:
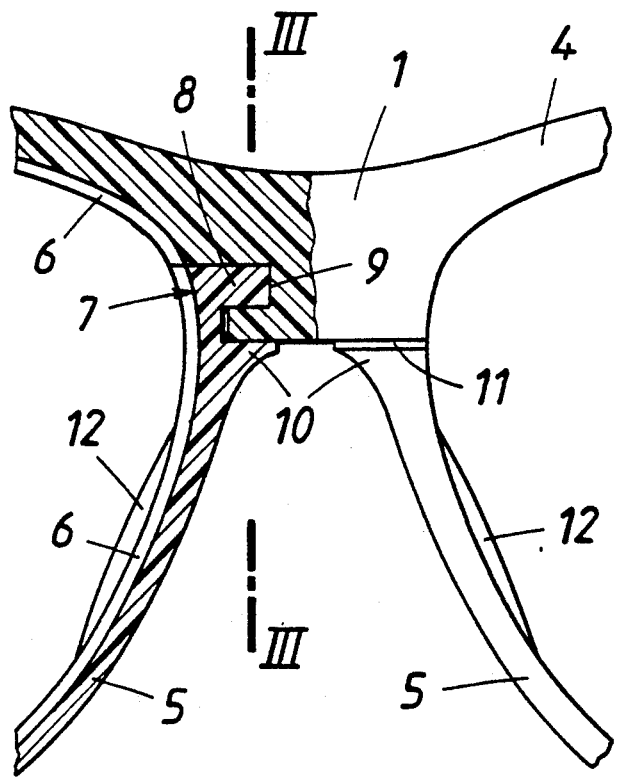
FIG. 2 is an enlarged fragmentary view showing partly in section a portion of the eyeglass rim of FIG. 1 adjacent to the bridge.
Figure 3:
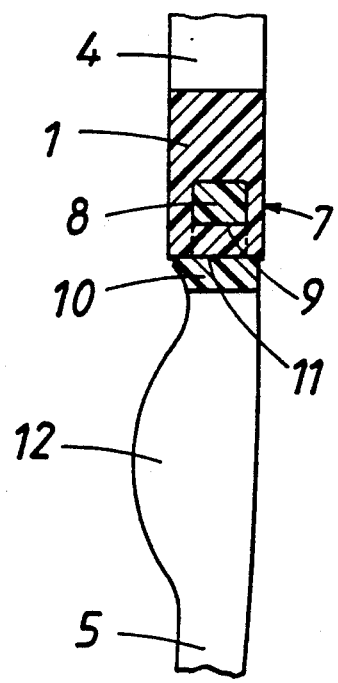
FIG. 3 is a sectional view taken on line III—III in FIG. 2.

The illustrated rim of the eyeglass frame comprises two lens-holding rings 2, which are connected by a bridge 1 and define respective lens-receiving openings, each of which contains a lens 3. Said lens-holding rings are not integral but are split and are constituted by a flexurally stiff common top rim member 4, which includes also the bridge 1, and two flexible bottom rim members 5. The top rim member 4 and each bottom rim member 5 is formed with a groove 6 for receiving each lens 3. Each of said bottom rim members 5 is connected to the top rim member 4 by positive coupling means 7, which are particularly apparent from FIGS. 2 to 5 and comprise two hooks 8, which are integrally formed on the bottom rim member 5 at opposite ends thereof and protrude on that side of the bottom rim member 5 which is opposite to the groove 6. Said hooks 8 extend outwardly relative to the associated lens-receiving opening. Each coupling means 7 also comprise two recesses 9, which are formed in the top rim member 4 and open to the lens-receiving opening and receive and interlock with the hooks 8. To couple a bottom rim member 5 to the top rim member 4, the hooks 8 are inserted from the inside of the lens-holding ring 2 into the recesses 9 so that the grooves 6 of the bottom rim member 5 and of the top rim member 4 together constitute a peripherally closed annular groove for receiving a lens 3. When the lens 3 has been inserted the coupling means 7 will be locked by the lens 3. Because the hooks 8 are positively locked in the recesses 9, the coupling means 7 provide not only a joint which resists tension in the peripheral direction but will also prevent a lateral displacement of the top rim member 4 and the bottom rim member 5 relative to each other. As a result, the conditions established when the lenses 3 have been inserted will be comparable to those in conventional eyeglasses. To ensure that the bottom rim members 5 will be joined to the top rim member 4 without a backlash, it is recommendable to form the bottom rim members 5 also with cover flanges 10, which cover the joints 11 between the bottom rim members 5 and the bridge 1, on the one hand, and the outer ends of the top rim member 4, on the other hand.

The nose pads 12 are constituted by the flexible bottom rim members 5 so that the flexibility of the bottom rim members 5 can be utilized to ensure that the nose pads 12 will apply a uniform pressure to the bridge of the wearer's nose and local pressure points will be avoided.

As is apparent from FIGS. 6 and 7 the bottom rim members 5 are preferably prefabricated as straight parts, which will be bent only as the eyeglass rim is assembled and the bottom rim members 5 will then adapt themselves to the contour of the associated lenses. Such straight prefabricated parts can be made in different lengths in a simple manner because it will be sufficient to provide detachable inserts in the intermediate portion of the mold cavity of a mold used to make such prefabricated parts so that the length of such prefabricated parts can be decreased and increased as may be desired, whereas the length of the prefabricated bottom rim members 5 once they have been made can no longer be adapted to the peripheral length of the associated portions of the lenses.

We claim:

1. An eyeglass frame for holding lenses, comprising: a top rim member including a bridge; two bottom rim members, each having two ends, a nose pad, and a lens-holding groove extending between said two ends for receiving a lens therein; and coupling means for removably coupling said bottom rim members to said top rim member, said coupling means including tabs integrally formed on each end of each of said bottom rim members, said tabs of each of said bottom rim members extending away from each other in linear spaced relation and a plurality of recesses formed in said top rim member for accommodating the tabs of said bottom rim members, said recesses being positioned and opening in a manner whereby said tabs are locked in said recesses by said lenses in said lens-holding grooves.

2. An eyeglass frame according to claim 1, wherein said top rim member consists of a stiff material.

3. An eyeglass frame according to claim 2, wherein said two bottom rim members consist of a flexible material.

4. An eyeglass frame according to claim 3, wherein said two bottom rim members are prefabricated straight bottom rim members.

5. An eyeglass frame according to claim 4, wherein the lenses are generally circular and have a center point and a radial direction, said tabs are removably inserted into the recesses in a generally radial direction away from the center point and are locked in the recesses by the lenses that prevent an extraction of said tabs in a generally radial direction toward the center point.

6. An eyeglass frame according to claim 5, wherein said top rim member includes two apexes located on opposite sides of said bridge, wherein one recess is located adjacent to each apex defining corner recesses, said corner recesses facing each other.

7. An eyeglass frame according to claim 6, wherein two recesses are located on said bridge defining central recesses, said central recesses are in spaced opposite back to back relation to each other.

8. An eyeglass frame according to claim 7, wherein said corner recesses and said central recesses are in co-linear relation.

9. An eyeglass frame according to claim 8, wherein said top rim member has two upper lens-holding grooves, each upper lens-holding groove extending between a corner recess and a central recess.

10. An eyeglass frame according to claim 9, wherein said coupling means removably couples said bottom rim members to said top rim member in a coupling area, wherein each upper lens-holding groove meets the lens-holding groove of the respective bottom rim member in the coupling area to form a continuous lens-holding groove around the peripheries of the lenses.

* * * * *